US006661904B1

(12) United States Patent
Sasich et al.

(10) Patent No.: US 6,661,904 B1
(45) Date of Patent: Dec. 9, 2003

(54) METHOD AND SYSTEM FOR AUTOMATED ELECTRONIC CONVEYANCE OF HIDDEN DATA

(75) Inventors: Philip S. Sasich, Seattle, WA (US); Robert Jason Ashby, North Bend, WA (US); Yuval Fisher, San Marino, CA (US); Jaron Sampson, Olympia, WA (US); John Aikin Cushing, Olympia, WA (US); Judith Bayard Cushing, Olympia, WA (US); Zach Gray, Olympia, WA (US); S. Leigh Fulwood, Seattle, WA (US)

(73) Assignee: Personalogo, Seattle, WA (US)

( * ) Notice: Subject to any disclaimer, the term of this patent is extended or adjusted under 35 U.S.C. 154(b) by 0 days.

(21) Appl. No.: 09/350,256

(22) Filed: Jul. 8, 1999

Related U.S. Application Data
(60) Provisional application No. 60/092,855, filed on Jul. 15, 1998, and provisional application No. 60/118,925, filed on Feb. 5, 1999.

(51) Int. Cl.[7] .................................................. G06K 9/00
(52) U.S. Cl. ........................ 382/100; 382/249; 713/176
(58) Field of Search ................................ 382/248, 249, 382/100, 232, 251, 252, 253; 713/176

(56) References Cited

U.S. PATENT DOCUMENTS

| | | | |
|---|---|---|---|
| 4,941,193 A | | 7/1990 | Barnsley et al. ............... 382/56 |
| 5,065,447 A | | 11/1991 | Barnsley et al. ............... 382/56 |
| 5,347,600 A | | 9/1994 | Barnsley et al. ............... 382/56 |
| 5,416,856 A | | 5/1995 | Jacobs et al. ................. 382/232 |
| 5,430,812 A | * | 7/1995 | Barnsley et al. ............. 382/235 |
| 5,721,543 A | | 2/1998 | Johnson et al. ................ 341/50 |
| 5,727,092 A | | 3/1998 | Sandford, II et al. ........ 382/251 |
| 5,768,437 A | * | 6/1998 | Monro et al. ................. 382/239 |
| 5,812,788 A | | 9/1998 | Agarwal ...................... 395/200 |
| 5,867,603 A | * | 2/1999 | Barnsley et al. ............. 382/249 |
| 5,889,868 A | | 3/1999 | Moskowitz et al. ........... 380/51 |
| 5,924,053 A | * | 7/1999 | Horowitz et al. .............. 702/90 |
| 6,002,794 A | * | 12/1999 | Bonneau et al. ............. 382/166 |
| 6,018,724 A | * | 1/2000 | Arent .......................... 705/44 |
| 6,078,619 A | * | 6/2000 | Monro et al. ................. 375/240 |
| 6,141,017 A | * | 10/2000 | Cubillo et al. ............... 345/439 |
| 6,332,030 B1 | * | 12/2001 | Manjunath et al. .......... 382/100 |

OTHER PUBLICATIONS

Barnsley and Sloan, "A Better Way to Comress Images", Jan. 1988; "Byte" Magazine –All Pages.
"Fractals and Self Similarity", John E. Hutchinson; Indiana University Mathematics Journal , vol. 30, No. 5 (1981).
Barnsley, M.F. and Sloan, A.D., "A Better Way to Comress Impages," BYTE: 215–223 (Jan. 1998).
Hutchinson, J.E., "Fractals and Self Similarity," Indiana University Mathematics Journal 30/5:713–747 (1981).

* cited by examiner

*Primary Examiner*—Samir Ahmed
*Assistant Examiner*—Anand Bhatnagar
(74) *Attorney, Agent, or Firm*—James L Davison

(57) ABSTRACT

A transformation of a data object called a personal logo contains personal data for transmitting from a client computer to a server computer. The personal data is embedded into transformation coefficients derived using one of several encoding techniques. The personal data is extracted from the transformation coefficients by the server computer to complete the transaction. The personal logo is created by or selected by a user and is made unique using a randomization algorithm to ensure differentiation from every other personal logo. Personal data is embedded into the unique personal logo in a way that hides it and makes it difficult for an unauthorized party to extract. The personal data includes data use limitations that limit what an authorized receiver may do with the personal data after receipt. Network transactions are automated through the creation of a drag-and-drop interface representing the act of data transmission. The particular personal data to be transmitted is requested by an application server and approved by the user. Keystroke errors are limited due to the automated nature of the transaction.

4 Claims, 12 Drawing Sheets

METHOD AND SYSTEM FOR AUTOMATED ELECTRONIC CONVEYANCE OF HIDDEN DATA

CROSS REFERENCES TO RELATED APPLICATIONS

The present patent application depends from the U.S. provisional patent application entitled DATA PROCESSING SYSTEM AND METHOD FOR CREATING A UNIQUE GRAPHICAL REPRESENTATIVE (A PERSONAL MARK OR ELECTRONIC SEAL) FOR AN UNLIMITED NUMBER OF USERS AND INTEGRATING THIS MEANS OF COMMUNICATING PERSONAL IDENTITY ON COMPUTER NETWORKS WITH CONTROLS, SECURITY MEASURES, AND VERIFICATION PROTOCOLS APPROPRIATE TO EXECUTING ALL TYPES OF ON-LINE TRANSACTIONS AND COMMUNICATIONS, Serial No. 60/092,855, dated Jul. 15, 1998. The present patent application also depends from the U.S. provisional patent application entitled DATA PROCESSING SYSTEM AND METHOD FOR CREATING A UNIQUE GRAPHICAL REPRESENTATIVE . . . EMBEDDING DATA AND INTEGRATING . . . , Serial No. 60/118,925, dated Feb. 5, 1999.

TECHNICAL FIELD

The present invention is directed to the field of electronic transmission of data.

BACKGROUND OF THE INVENTION

From the earliest days of commerce, personal presence has had an important role in the conduct of business. Face-to-face dealings have lent an air of credibility to transactions. A handshake has proven an invaluable instrument for establishing trust. Later, formalized documents became acceptable proxies for such face-to-face transactions. The personal signature of a recognized party to the transaction became an acceptable substitute for face-to-face presence. As the information age progressed, faxed signatures often became recognized as the equivalent to an original physical signature.

As technology continues to evolve, there is need to provide equivalent means to the handshake and personal signature for Internet and other electronic transactions. The present invention teaches a method and apparatus for sending personal data from a first computer to a second computer across a network and establishing the equivalent to personal presence.

One embodiment of the present invention relates to the field of fractal transformation. Fractal transformation may be used to compress audio, video, graphical, and other types of data. Throughout this document, fractal graphical image processing will be used to illustrate the techniques taught. Similar art may be practiced on audio, video, and other types of data.

In fractal image processing, an image is divided into a number of library regions. The library regions are identified, or indexed, by their location in the original image. In some prior art, library regions are called ranges. The image is then divided into a number of similarly shaped target regions which, taken together, tile the entire image. In some prior art, target regions are called domains. In one variant, each target region is sequentially compared to each of the indexed library regions to find the one that most closely corresponds to it. In this comparison, the library region is allowed to be rotated, scaled, and offset relative to the target region. Scaling refers to changing the amount of gain or contrast within the library region to make it more closely match the target region. Offsetting refers to changing the overall lightness or darkness.

The most closely matched library region for each target region including such rotation, scaling, and offsetting is noted and stored in memory. The values for rotating, scaling, and offsetting each substitution are called transformation coefficients. After the transformations for all the target regions have been made, the resultant series of geometric relationships between library and target regions and their associated transformation coefficients are saved as a fractal transformation of the base image. The fractal transformation generally has the property of requiring significantly less computer memory to store than the base image. The actual data set is termed a fractal encodation.

Decoding a fractally transformed image is performed as an iterated series of back-substitutions of library region locations from a starting image for target region locations in an intermediate image using the transformation coefficients to adjust the offset, contrast, and rotation of each substituted target region. Following the first iteration of back-substitutions, the entire resultant intermediate image itself is substituted for the starting image. Following subsequent iterations, the resultant intermediate image is similarly substituted for the intermediate image resulting from the previous iteration. In one embodiment, the process is halted once any two successive intermediate images are sufficiently similar to one another. At this point, the decoded image is said to have converged.

One rather amazing property of a fractally encoded image is that it doesn't matter what the starting image for decoding looks like. The iterated geometric relationships and transformation coefficients themselves contain all the information necessary to reconstruct the original base image. The particular starting image chosen simply affects the number of iterations necessary for the decoded image to converge.

Another embodiment of the present invention relates to discrete wavelet transformation. Like fractal transformation, discrete wavelet transformation may be used to compress image, audio, video, and other data. Also like fractal transformation, the discrete wavelet transforms produce as one component a set of coefficients, the values of which are used to derive the image reproduction. One subcategory of discrete wavelet transformation is wavelet scalar transformation. Discrete wavelet transformation is the type of compression used in JPEG2000.

The invention taught herein is equally applicable to other types of data compression technologies and, in particular, image compression technologies that produce coefficients for deriving data reproduction and image reproduction.

SUMMARY OF THE INVENTION

One aspect of the present invention relates to methods of providing a digital signature for remote transactions. Another aspect of the present invention relates to methods of verifying the identity of a source of data. Embodiments of the present invention teach methods and apparatus for establishing the functional equivalent to personal presence, the handshake, and the personal signature in forms appropriate for use across electronic media. Another aspect of the present invention teaches methods for automatically transmitting information relevant to a particular transaction. In particular, the present invention teaches technologies appropriate for use in local area network and Internet transactions.

The present invention makes use of digital graphical bitmaps to establish a visual representation of a sender's identity and authority. Corresponding data streams are used to transmit the sender's identity, authority, and data associated with the sender across a network.

A specifically selected or generated digital graphical bitmap used to establish a visual representation is termed a base image. A base image which is further processed to make it unique is called a personal logo. The data stream representing a personal logo is called a unique graphic personal identifier or UGPI. A UGPI to which personal data has been added is called a data conveyance object or DCO. In general, the base image and personal logo appear virtually identical to one another and the base image may be displayed in place of the personal logo without violating the scope or intent of the present invention. In some applications, it is not necessary or desirable for a base image to be made unique from all other instances of its use. In these applications, the personal logo and the base image may, in fact, be identical. In some embodiments of the present invention, the personal logo is related to the UGPI by a compression algorithm or other transformation, the UGPI being the compacted or transformed data stream representing the personal logo. In other embodiments where neither compaction nor transformation is used, the UGPI may simply be the bitmap of the personal logo in its electronic, non-displayed form. One method for making the base image unique is the integration of personal data. In this case, the UGPI itself may act as the DCO. It should be noted that other processes that occur during data transmission may further compress or otherwise alter the DCO temporarily.

The means for transmitting data taught by the present invention is the embedding of data into a UGPI. It is desirable for the embedding of data to alter the nominal appearance of the personal logo minimally or not at all. Several methodologies may be used for embedding such data including direct substitution or appending of data bits into bitmap pixel data, discrete cosine transformation, discrete wavelet quantization, and fractal transformation.

Another aspect of the present invention relates to methods for controlling the use of data. Along with personal data, restrictions as to the use of said personal data may be encoded into a UGPI. When received by a transaction server in a DCO, such use restrictions may be automatically logged and the personal data treated according to the restrictions.

Another aspect of the present invention relates to methods for encoding personal information in a form that makes it difficult for an unauthorized party to retrieve. By its very nature, personal data embedded in image transformation coefficients or distributed across an image in a secret way is difficult to retrieve. Such unauthorized retrieval may be further stymied by encrypting said personal data before embedding and/or by encrypting the DCO prior to transmission. Of notable interest is the ability of the present invention to maintain a measure of secrecy even when transmitted via an unsecured data link.

Another aspect of the present invention relates to methods for automating the choosing of data for transmission. One embodiment of the present invention teaches the use of logo levels to encode data. Each logo level encodes a different subset of personal data. The appropriate logo level may be chosen by the user or may be automatically chosen by data communication between a transaction program and the client program.

Another aspect of the present invention relates to methods of verifying the identity of a data destination. During a transaction, the identity of a transaction server is provided by a presentation server. The identity of said transaction server is then presented to the user for approval prior to transmission of data. In this way, the user stays in control of the entire transaction.

DETAILED DESCRIPTION OF THE INVENTION

Figure 1:
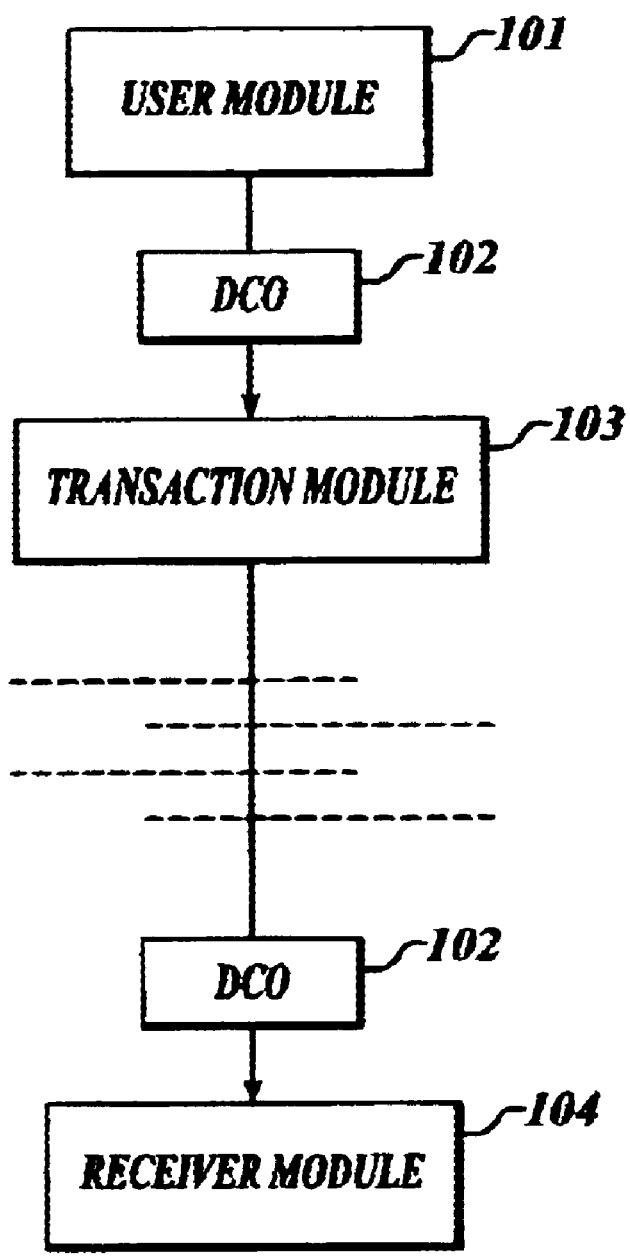
FIG. 1 illustrates modules used during a transaction involving the present invention.

FIG. 1 shows the system components of one embodiment of the present invention. The user module, 101, provides a means of controlling the content of a raw data cache and personal logo. The user module also provides a graphical user interface for the integration and encryption of data and transmission to a transaction module. A graphic object which serves as the point of interface is a personal logo or UGPI as described elsewhere in this document. In other embodiments, other types of interfaces including command lines, radio buttons, check boxes, control buttons, and other graphic objects or groups of objects may act as the point of interface. Audio, video, and other objects may also serve as a point of interface. The user module provides an interactive methodology for a client to control the content of data to be transmitted during a transaction. It selects appropriate data from the raw data cache and combines it with a unique graphic personal identifier (UGPI) so as to hide said data. The data stream that results from combining the UGPI with data appropriate to a particular transaction is a data conveyance object or DCO, 102. In some embodiments, the particular data required for a transaction is customized. Such custom data sets, known as custom logo levels, may be stored in their own data caches.

In one embodiment, all the raw data is stored in a UGPI. During a particular transaction, the user chooses appropriate data, and the user module deletes data not needed for the present transaction. In another embodiment, the user module adds selected data to a UGPI to form a DCO immediately prior to executing a transaction.

The UGPI with particular data appropriate to the present transaction comprises the data conveyance object, 102. The data conveyance object is provided to the transaction module when the user selects a logo level and drags the displayed logo to a drop target or logo pocket. Logo levels comprise predefined sets of data to be sent during a transaction. In principle, there is no limit to the number of different groupings of data and hence no limit to the number of logo levels. In one embodiment, there are four logo levels, each successive level encoding more data than the last. Each successive level encodes information that is more and more detailed. Logo level 1 includes name and email address. Logo level 2 encodes name, email address, and physical address or street address. Logo level 3 encodes name, email address, physical address, and telephone number. Logo level four encodes name, email address, physical address, telephone number, and credit card number. Additional types of data or different associations of data will be obvious to one skilled in the art. Optionally, there are data-use instructions associated with, and encoded in, each logo level. The data-use instructions are automatically recorded by the transaction server The transaction module, 103, is an application that provides a drop target area or logo pocket. In one embodiment, the transaction module may be a control or applet hosted by a browser or other client software. In another embodiment, the transaction module may be embedded in a web page or other application hosted by a transaction server. Dropping a personal logo on the drop target represents the act transmitting data to another machine. Following enablement by the client, the data conveyance object is transmitted across the network to a receiver module residing in a transaction server. The receiver module, 104, runs on another machine on the network, and is responsible for decrypting the data conveyance object, extracting data, and passing appropriate data on to third party software. Another aspect of the receiver module is a recording of data-use instructions conveyed within the data conveyance object.

During data extraction, performed by the receiver module 104, a spreading code may be read from a predetermined location in the DCO, 102. The spreading code instructs the decoder which transformation coefficients contain user data. The spreading code may be related to user data locations algorithmically or by reference to a lookup table. Alternatively, user data may simply start at a predetermined starting position and proceed in a stepwise fashion through the series of transformation coefficients.

Figure 2:
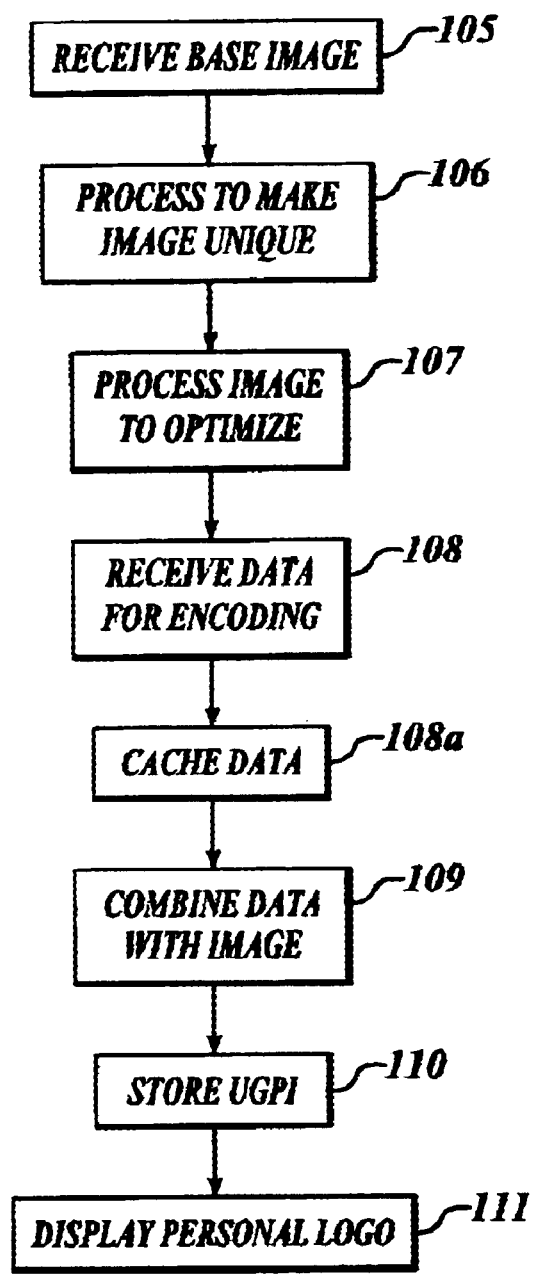
FIG. 2 illustrates a method for creating a personal logo.

FIG. 2 shows a methodology for creating a personal logo. To make use of the personal logo capability, a user may first install client software on his or her computer. Such client software may be downloaded from the Internet or loaded from local storage media such as a CD-ROM or floppy disk. Installation is initiated using well known techniques. During installation, a user is given several prompts and makes several responses to initialize the software, select a starting logo that will be known as the base logo or base image, and enter personal data. Alternatively, the software for creating a personal logo may be a module in a browser or may be a web- or LAN-based application.

First, an initialization module requests the user to select a logo. During base image selection, 105, the user chooses an image from which their personal logo and UGPI will be derived. A variety of such base logos are predefined and may be downloaded from a web site or selected from a number of alternative designs provided with the software. The base image may be created or drawn by the user using computer design tools, may be selected from a library of base images or may be scanned in. A base image may take the form of a ornamental design, a picture of the user's face, the user's signature, a representation of the user's fingerprint, or any other two-dimensional representation. Furthermore, a base image may take the form of a three dimensional object. A holographic display allows full representation of a three dimensional object while a two-dimensional display allows the projection of that object onto two dimensions. Furthermore, any image object including graphical, audio, and video objects may serve as a base image and, correspondingly, be transformed into a personal logo and a DCO.

An object chosen as a base image may be displayed on the user's computer following selection. In one embodiment, the chosen object is small relative to the overall display but large enough to create space in which to store personal data without adversely affecting the appearance of the object. In one embodiment, a base image is a two-dimensional bitmap image of approximately 100×100 pixel size with 24 bit color. Such an object may have 8 bits of grayscale in each of the 3 colors red, green, and blue, often described as RGB. Eight bits of grayscale in each color represent 256 different intensities of each of the colors. An object with these characteristics requires 30,000 Bytes to represent in an uncompressed bitmap format. This base image may be derived from a common image format such as JPEG or GIF.

For embedding large amounts of data, a larger base image or multiple linked base images may be desirable to prevent degradation of the appearance of the personal logo relative to the base image.

It is not necessary that a base image chosen be completely unique from all other base images. The process of embedding personal data transforms the base image to a personal logo and UGPI, whereby the personal logo does become completely unique from all other personal logos created from the same base image. In some cases, it may be desirable to carry out additional processing on the base image prior to embedding data to further differentiate the resultant personal logo or to distinguish the creation of a particular instance of a personal logo from all other instances of creation.

Step 106 is an optional step wherein the base image is altered or perturbed to form a UGPI. In general, a derived image created by step 106 is visually indistinguishable from the original base image.

During processing to create a personal logo, other processing to make the graphic compressible, efficiently transmittable, and integrateable with other system functions, represented by step 107, may optionally be performed. These steps will not significantly alter the personal logo in its visible form, but will become distinguishable with application of specific processing steps.

In step 108 the user is prompted to input personal data. In one embodiment, this personal data includes name, email address, telephone number, physical address, and credit card number. These pieces of data are then deposited in the raw data cache for later combination with the UGPI to form a DCO. The raw data cache itself may be encrypted and stored in an encrypted form. In general, any data may be combined into the UGPI to form a DCO. This method is especially appropriate for combining data that is of a personal nature that the user does not want available for unauthorized use but does want to make available to a particular receiving party. Such data may include, but is not limited to; a name, an email address, a physical address, a telephone number, a credit card number, a social security number, a mother's maiden name, a personal identification number, a gender, a race, a religion, a disability, a sexual preference, a blood type, an allergy, a measure of income, a hobby, a name of a publication subscribed to, a job title, an injury, a garment size, a weight, an eye color, a fingerprint, a hand geometry, a height, a food preference, a disease, a hair color, a genotype, a voice print, a post office box, a shoe size, an occupation, an accreditation, a date of birth, a date of encoding, a place of birth, a time of encoding, a filename, a universal record locator, an iris code, a retinal code, a license number, a security clearance level, a language, a processor serial number, and an alias. What these data have in common is that they are data that are not generally knowable by a third party across a network unless expressly transmitted by the user but they may be useful to an intended receiving party. In addition, custom data caches may be created and used by entities with which the user has transactions. These custom data caches are preferably encrypted and stored in a form and/or location that makes them resistant to alteration by the user. A custom data cache used by a bank, for instance, may contain account information and one or more pieces of verification information used to authorize transactions. For purposes of clarity, this document will generally refer to personal data and a raw data cache. It is to be understood that one or more groupings of third party data and one or more custom data caches may generally be used in place of personal data and a raw data cache.

In step 108a, the personal data is deposited in a raw data cache which includes groupings of user specified personal and privacy data and transaction-related protocols. Custom data caches may be formed in connection with certain kinds of transactions. Custom data caches may be created by either the client side or the server side of a transaction in the case of a client-server architecture or by any peer in the case of a peer-to-peer architecture. Clients, servers, and peers may be connected using any available technology. Each cache exists in a database as a passive item before online transmission capabilities and integration with other user processing objects are incorporated. Each cache contains selected items of data and user specified instruction sets allocated to the cache during set-up. The data items and instruction sets are designed to meet the requirements, security needs, and verification requirements of certain kinds of transactions. The number of caches that can exist is open-ended. Caches can also be distinguished by type of electronic storage technology, for instance hard disk, touch memory, floppy disk, etc., and by types of other software devices used with the data, particularly those performing security and encryption functions. Each raw data cache will be encoded to operate at a designated level of security commensurate with protection appropriate to the kind of data contained within it and required by the anticipated transaction. Raw data cache level 1 may contain basic username, email address, and appropriate base level security. Raw data cache level 4 may contain credit card numbers and other sensitive personal financial data requiring higher designated levels of security and verification.

Step 109 is optional at the time of personal logo creation. Step 109 combines the input personal data with the base image from step 105 or, alternatively, the transformed image from in step 106 or, alternatively, the further processed image from step 107. Step 109 represents the combination of personal data into the unique image to form the UGPI. In one embodiment, the data is combined by means of fractal image processing.

In step 110 the UGPI is stored in the client computer or other electronic storage media for user recall. Step 111 is an optional step wherein the personal logo is displayed on the user's monitor.

There are several methods for making an image unique as in step 106. In a first step, a random or pseudo-random number can be generated using some algorithm, and this identifier can be embedded into an image appended to personal data. Examples of data that may act as random or pseudo-random numbers to impart uniqueness include time of day, date, mouse position, a measure of keystroke delay, an algorithm, a checksum of memory or hard disk contents, or a Serial Number issued by a web site. One or more of the above examples may be combined. Other methods will be apparent to those of ordinary skill in the art.

A second part of step 106 for perturbing the base image involves altering the image in some way as a function of the random or pseudo-random number. In one method, random or pseudo-random data replaces at least some data in the image. One embodiment randomizes the least significant bit of each pixel color value. Another method modifies transformation coefficients. The method for doing this is similar to the method of personal data encodation described below except that random or pseudo-random data in inserted instead of personal data. This method for creating uniqueness may be carried out at the same time as insertion of personal data or may operate prior to or after insertion of personal data. If uniqueness processing occurs before personal data insertion, any transformation coefficient may be altered. If carried out at the same time or after personal data insertion, uniqueness processing must be distinguishable from personal data inserted in order to ensure recover of personal data by the receiver module. This can be ensured by altering different transformation coefficients that were altered by personal data insertion or by altering the same transformation coefficients in a different way, for instance at a different digit.

A second method for imparting uniqueness uses transform selection randomization. The inventors have discovered that for most images, the second-best fit, third-best fit, etc. yields an encodation that is almost as good as choosing the best fit. This is expressed by the fact that such a sub-optimal encodation decodes to an image that is virtually indistinguishable from an image decoded from an encodation derived from best-fit matches. Moreover, even though the image suffers little degradation, the encoded file is significantly different from one derived only from best-fit matches. This provides a convenient way to characterize large differences between images that are visually very similar.

Transformation selection randomization is useful when the personal logo and UGPI are related by means of a transformation.

Figure 3:
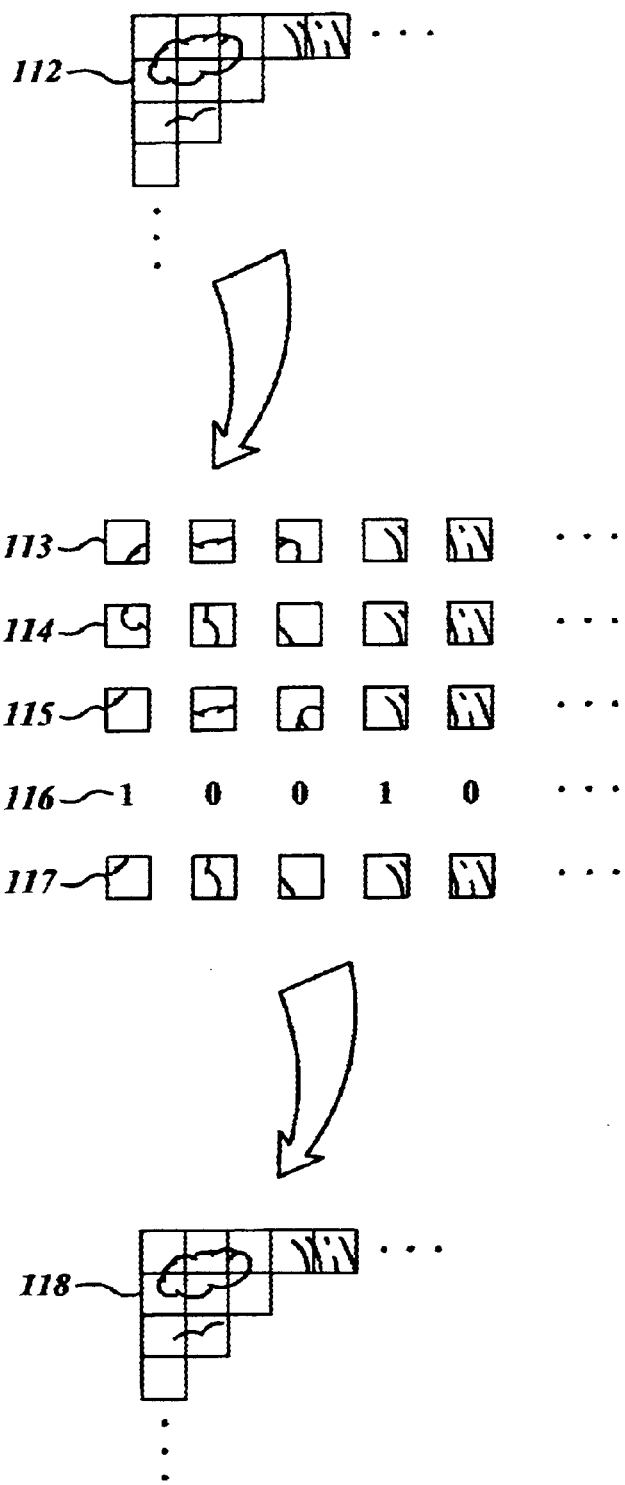
FIG. 3 shows a method for creating a personal logo from a base image that is not necessarily unique. The method shown is the fractal transformation randomization method.

FIG. 3 illustrates the fractal transform selection randomization method for making an image unique. The transform selection randomization method yields uniqueness that is completely independent of personal data encoding and does not degrade data capacity. In contrast to random data appending, transform selection randomization doesn't affect the decoder at all. There is no need to parse randomization data to separate it from personal data. Moreover, is possible to create an index into the fractal encoding so as to generate a particular transform selection pattern, the Nth encoding, at any time. This can be used to verify that the encoding was generated by the correct algorithm and provides an additional level of security. For these reasons, it is a preferred method.

In the prior art, during the comparison process only the best current library block was stored for further comparison. The modification of the present invention stores a list of best matches. In step 106, a different library block than normal will be occasionally selected for each target block and the total collection will result in a unique image representation. In fact, if there are N target blocks in image (a typical N would be around 1500), then using just 2 different possible library blocks (for instance, the best and second-best matches) would result in two to the power of N different possible image representations.

FIG. 3 illustrates transform selection randomization for the case where fractal processing is used. Other image processing techniques that select from multiple possible transforms also work with this technique and would be obvious to those of ordinary skill in the art.

A modified image is created using transform selection randomization by choosing transformations in a random or pseudo-random way. First, a base image 112 is received. As is described in the background and summary of the invention, base image 112 is divided into an array of target blocks 113. Each target block is compared to a very large number library blocks. The library blocks are comprised of larger image pieces that may overlap or have different orientations than the target blocks.

In the prior art, the comparison process looks for an indexed library block that is most similar to the target block. In comparing target blocks and indexed library blocks, the fractal encoder performs tentative rotation, scaling, and offsetting of the target block to get the best overall fit. Rotation is typically stored as two bits that encode 0°, 90°, 180°, and 270° orientations. Offsetting characterizes the overall change in darkness necessary to make the target block most similar to the library block. Scaling characterizes the change in contrast ratio between the lightest and darkest pixels in the target block to make it best match the library block. After the most similar library block is found for given target block, a set of transformation coefficients giving rotation, offset, and scale are saved along with the location of the target block. Together, this information forms the fractal transform.

Each target block 113 is compared to all the library blocks. In the present invention, a plurality of most similar library blocks is saved. In FIG. 3, the plurality of most similar library blocks are illustrated by the most similar library blocks 114, and the second most similar library blocks 115. The particular number of the plurality of most similar matches saved is a matter of design choice.

A random number 116, created by one or a combination of the methods described above, is introduced. In FIG. 3, this random number is represented in its binary form corresponding to the number of best fit library blocks from which choices will be made.

For FIG. 3, a binary 1 determines the selection of the second most similar library block and a binary 0 corresponds to the selection of the most similar library block. Library blocks 117 represent the array of transformations chosen according to this method.

Finally, a perturbed image 118 may be assembled by decoding the resultant transformation. This is performed iteratively using techniques described elsewhere in this document. Preferably, it is performed using a random starting image and successive iterations at a series of constant, small image sizes.

Using transform selection randomization, it is possible to generate a very large number of uniquely encoded images from a single base image wherein each decoded image is visually identical or very similar to all other decoded images.

As stated above, step 109 represents combination of personal data into the unique image to form the personal logo. In one embodiment, such data is substituted for the least significant bit in each of a sequence of pixel values that describe the bitmap image. In another embodiment, the data is combined by means of fractal image processing.

During fractal image processing, a series of coefficients describing the relationships of target blocks to library blocks is generated. One property these coefficients is that small differences in the base image results in large changes in the coefficients. It has been discovered that relatively large changes in the transformed coefficients result in only small changes to the encoded image. The present invention makes use of this discovery by altering the coefficients a transformation so as to encode personal data therein. In particular, there is uncertainty as to the least significant bits of information in the coefficients. That is, a relatively small change in the base image can result in large changes in the least significant digits.

In a preferred embodiment, personal data is appended to and replaces the least significant bits of the coefficients of transformation. The coefficients of transformation are thus limited in resolution but this doesn't greatly affect image quality.

Figure 4:
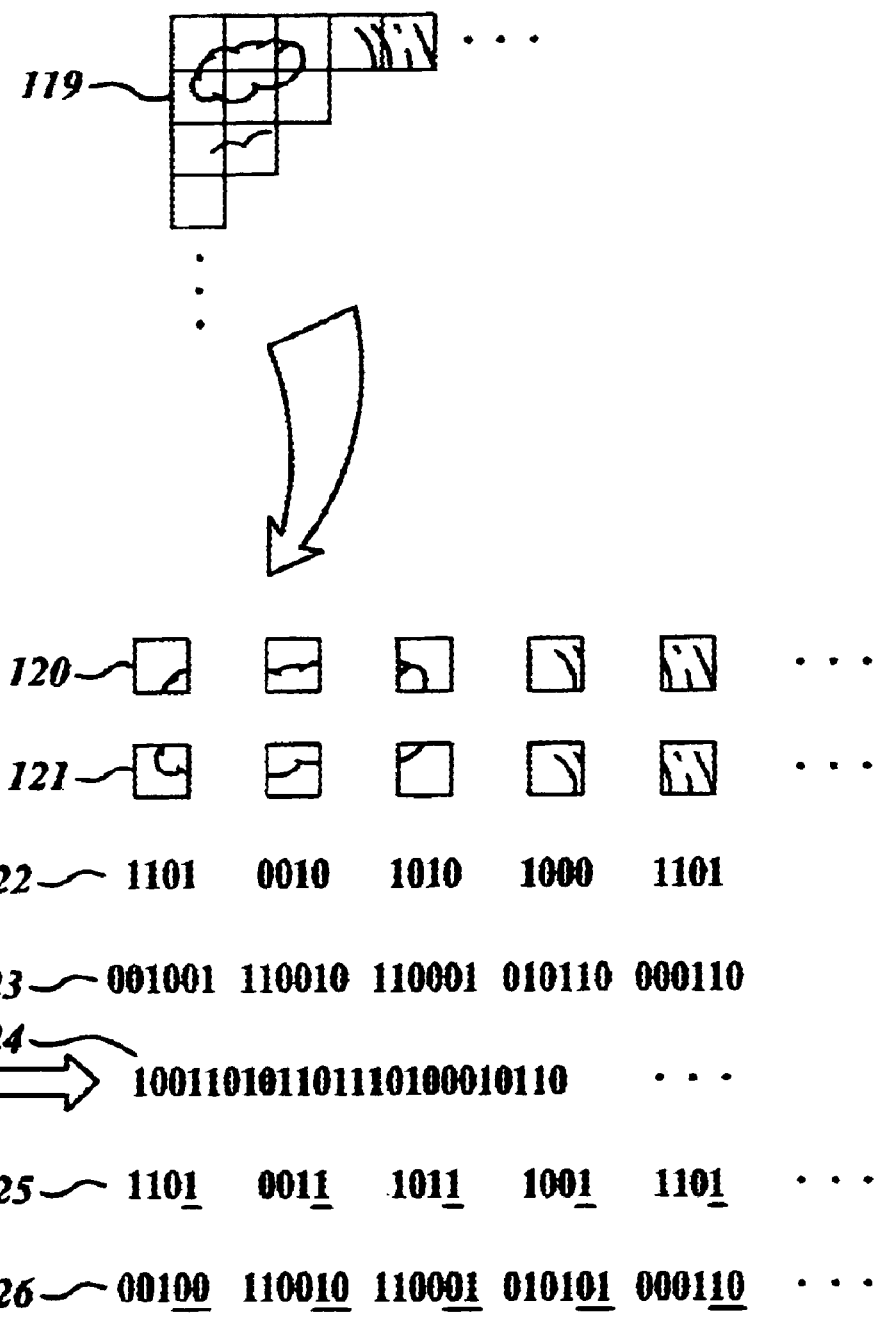
FIG. 4 illustrates a method for adding data to a fractally transformed graphic image.

FIG. 4 illustrates a method for adding personal data to a logo using a method of fractal image processing. First an image 119 is established using methods described above. Image 119 is divided into target blocks 120. Target blocks 120 are compared to a large number of library blocks and the most similar library blocks 121 are selected. Along with the most similar library blocks, transformation coefficients describing rotation, scaling, and offset are retained. In FIG. 4, scale coefficients 122 and offset coefficients 123 for each transformation are depicted. In this example the scaling coefficient is represented by a 4-bit binary number and the offset coefficient is represented by a 6-bit binary number. Alternative amounts of resolution are a matter of design choice.

Data 124 is read. This data represents personal data input by a user in binary form. According to the data appending or prepending method of image randomization described above, data 124 may also contain random information. According to the present invention, data 124 may alternatively be encrypted.

Data 124 is appended to transformation coefficients or substituted into transformation coefficients. FIG. 4 shows a preferred method for substituting data into scaling and transformation coefficients 122 and 123, respectively, to create modified transformation coefficients 125 and 126. For the present example, the first bit of data 124 is substituted for the last bit of the first scaling coefficient 122 to form the first encoded scaling coefficient 125. The second and third bits of data 124 are substituted for the two least significant bits of the first offset coefficient 123 to form the first encoded offset coefficient 126. The fourth bit of data 124 is substituted for the last bit of the second scaling coefficient 122 to form the second encoded scaling coefficient 125. The fifth and sixth bits of data 124 are substituted for the two least significant bits of the second offset coefficient 123 to form the second encoded offset coefficient 126. Alternatively, data may be appended to transformation coefficients 122 and 123 rather than substituting.

This process proceeds until all the data has been thusly encoded. After all the data has been encoded a stop character may be encoded to indicate the end of text. Alternatively, all binary zeros or binary ones may be encoded for all remaining least significant bits of coefficients 122 and 123. Alternatively, data may be distributed over transformation coefficients 122 and 123 according to a spreading code. The spreading code may itself be encoded at a predetermined location. A data identifier data structure may be employed to indicate the positions and nature of data fields, either singly or in concert with one of the aforementioned data distribution schemas. Other methods of distributing data will be obvious to those of ordinary skill in the art.

Figure 5:
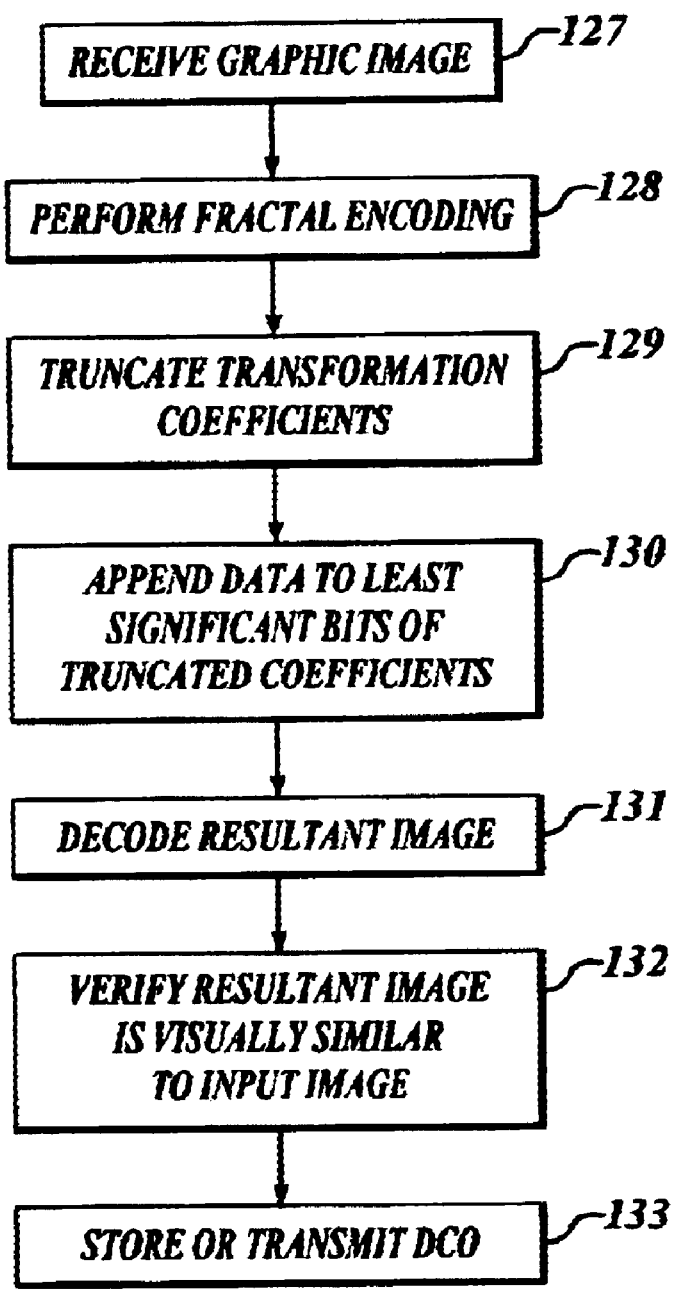
FIG. 5 shows another depiction of adding data to a fractally transformed graphic image.

Another depiction of adding personal data to a graphic image is shown in flow chart form in FIG. 5. FIG. 5 shows the details for generating personal logo through appending of personal data to transformation coefficients. Step 127 refers to the receipt of an image for embedding the data. This image may be in the form of a base image if adding user data alone is intended to produce uniqueness. Alternatively, the image may be a UGPI. In step 128, fractal encoding of the image is performed. The transformation coefficients, specifically and preferably offset and scaling coefficients, are then truncated according to step 129. This may result in some loss of image quality but generally not to significant degree. In step 130 user data is appended to the least significant bits of the truncated coefficients so as to replace the data truncated in step 129. The image is then optionally decoded in step 131 to create an altered graphical image. In optional step 132, the altered graphical image may then be compared to the input image to verify that there is little perceptual difference in the two images. The resultant altered image then is stored as shown in step 133. Alternatively, especially for an embodiment where personal data is combined with a UGPI at the time of a transaction, the personal logo may be transmitted in step 133.

If the comparison of the altered graphical image to the original image indicates an inappropriate amount of image degradation, the process is repeated using different data distribution.

Similar techniques may be used in conjunction with alternative transformation technologies. In the case of discrete wavelet transformation, a component of each transform is a set of coefficients, the values of which are used to derive image reproduction. Some of these coefficients are high-precision real numbers, meaning they are represented digitally using many bits, often 32 bits or more. The bits used to store the highest degrees of precision, that is, the least significant bits, often provide a degree of precision that is unnecessary or unused during decompression. Replacing the value of the least significant bits with other values generated by data or a random number has little or no effect on image quality after reconstruction and can be used to carry uniqueness and or data. As with unique image generation described above, data may be directly substituted into one or more least significant bits of grayscale data for one or more colors in some or all pixels in the image or may substitute whole pixels. For the purposes of this document, the depiction of an array of pixels in an image as grayscale values in one or more colors is also termed a transformation. In this case as elsewhere in this document, images other than graphical images including audio and video are meant to be included in this terminology.

Figure 6:
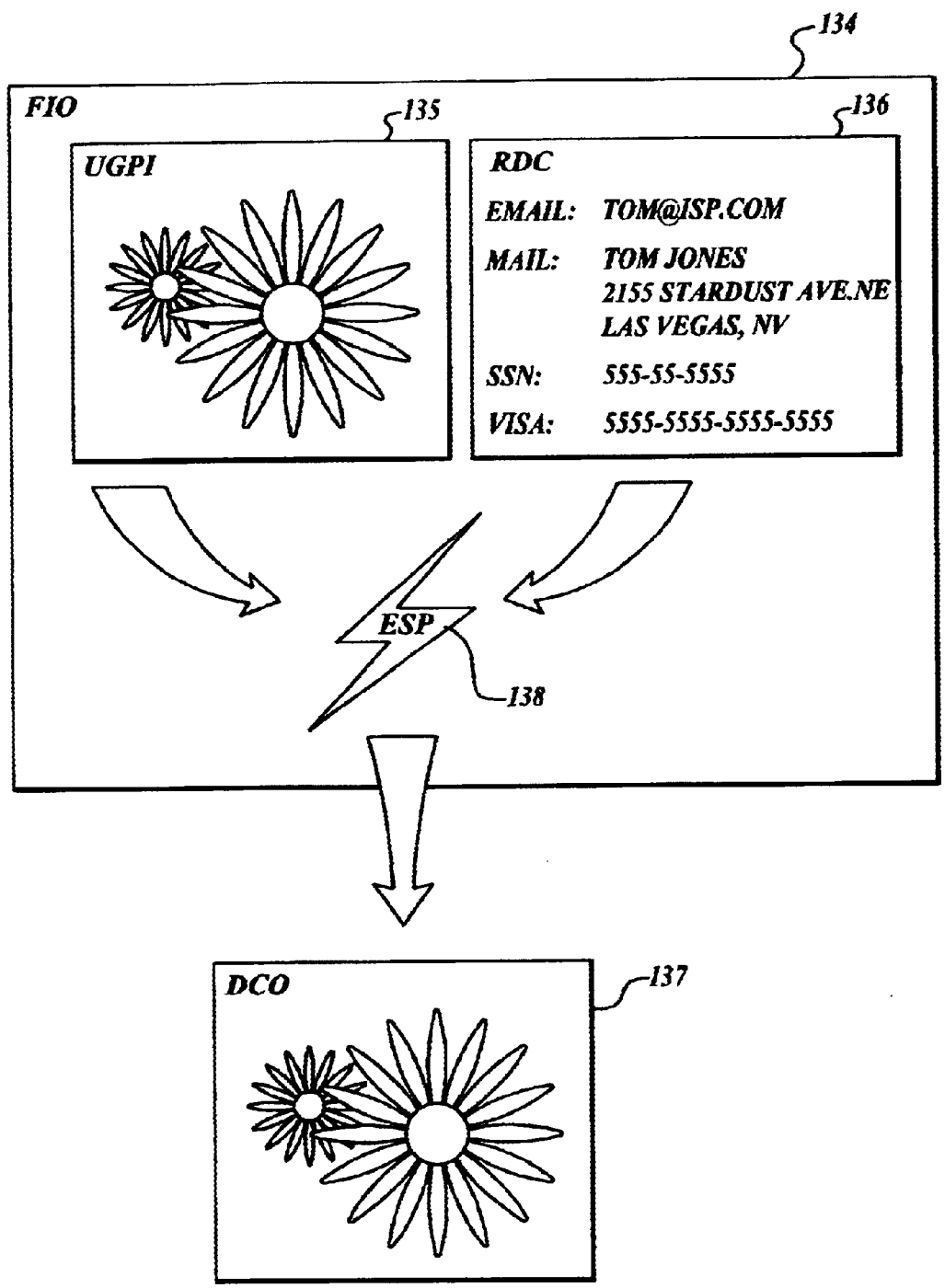
FIG. 6 shows how significant objects of an embodiment of the present invention interact to create a data conveyance object.

FIG. 6 graphically depicts the relationship between key components of the client-side software. The functions integration object, 134, is responsible for storing a personal logo, 135, and a raw data cache, 136 in a secure manner, and providing a consistent interface to the data no matter where may be stored. The functions integration object is also responsible for displaying the new account creation dialog boxes, removal of accounts, as well is restricting access to the raw data cache 136 and personal logo 135. The functions integration object also provides data conveyance objects, 137, created with the contained unique personal logo 135 and raw data cache 136 by combining them according to an embedding security protocol 138.

The functions integration object-based structure provides the overall system with capability to implement data conveyance objects and their component functions as discrete modules within the system. This gives the system the ability to incorporate new security technology, data storage technology, or other advances related to systems functions by simply creating the new functions integration object module containing the data conveyance object with the new technology. Thus new advances can be inserted into the system and made available to the user without reconstructing other operating components or system protocols.

An interface and control manager is a group of management and controller functions that operate at the encoded level to offer a graphical user interface menu of enabled personal logos, data conveyance objects, and embedded security protocol items. It enables a single mouse click or drag-and-drop interface to the user. This interface allows the user to initiate, coordinate, and control all elements of the transaction with mouse clicks or drag-and-drop selections. In response to the user's menu selections, the interface and control manager initializes processing in the user processing objects and executes integration processing. The interface and control manager accomplishes integration processing by selecting the functions integration object which constructs the appropriate data conveyance object in response to the user selection. At the electronic or operating level, the interface and control manager activates the functions integration object which constructs a DCO by integrating the encoded forms of the UGPI, data selected for the transaction, and embedding security protocol along with other protocols and instructions needed to enable use of these objects, data, and functions.

Another aspect of the functions integration object 134 is the creation of an immutable log of all transactions. In doing this, the functions integration object 134 may store transaction characteristic data relating to some or all of page server address, transaction server address, the logo level sent, data use instructions, time, date, perturbed logo characteristics, payment method, payment amount, and/or terms and conditions of the transaction. This information may be stored in an external file or, alternatively and preferably, encrypted and stored within the functions integration object data. The immutable log is accessible but may not be changed by a user and may thereby be relied upon to provide proof of transaction. A user may add comments to the log. A user may erase the log only by destroying the entire account.

This method offers significant efficiency and simplicity in that all elements of the transaction can be controlled from the user side, thus offering the user the control necessary to establish both the sense and fact of privacy.

Figure 7:
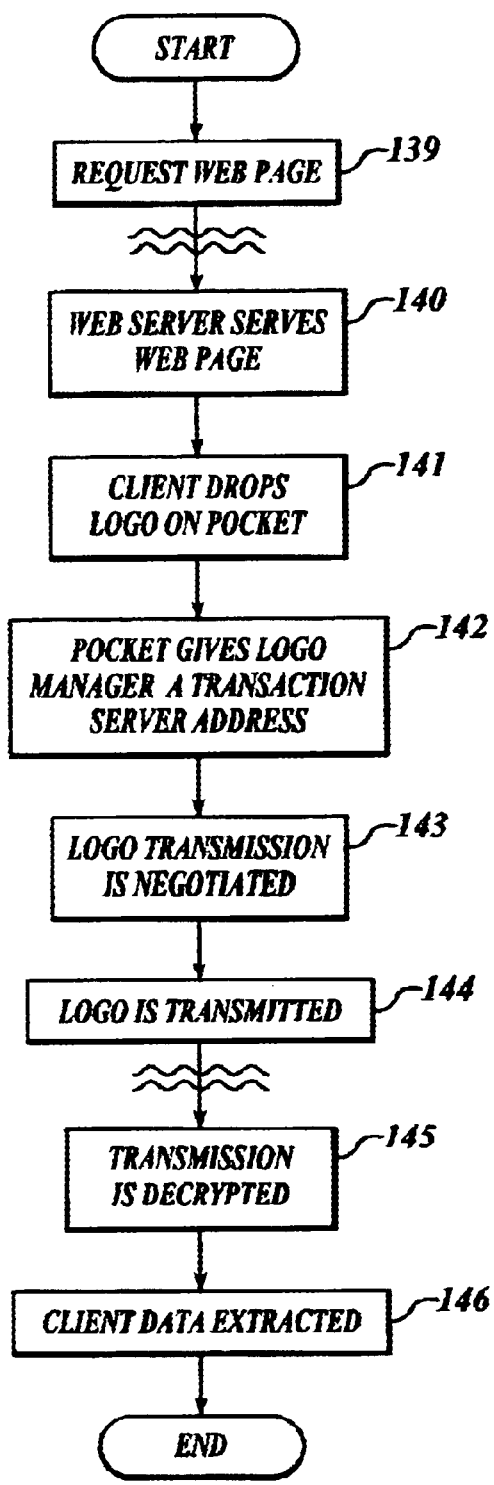
FIG. 7 gives a method for performing a transaction according to the present invention.

FIG. 7 depicts the process by where a user operates the present invention. The user first requests a Web page according to step 139, typically by selecting a uniform resource locator on his Web browser. The Web server then presents the Web page to the client 140. To enable a transaction, the user drops his personal logo on a pocket provided on the Web page 141. In step 142, the pocket transfers a transaction server address to a logo manager. The transaction server address may be different than the page server address. In step 143, logo transmission is negotiated between the client and the transaction server. As a final step, the user is prompted to acknowledge the transmission of personal data in the form of his personal logo. The logo is then transmitted to the transaction server 144. The transmission is decrypted to retrieve the personal logo 145. In step 146, client data is extracted from the personal and any authentication protocol is conducted. Client data is conveyed to third party software to finish the transaction. Step 146 also extracts any data-use restrictions selected by the client. Finally, the personal logo is discarded or retained for authentication purposes and data-use restrictions may be logged.

Optionally, additional steps may be inserted into the process illustrated by FIG. 7 wherein the transmitted image is decoded and displayed by the computer that receives the transmission. This may be used to verify authentication of the received transmission. The embodiment of this technique preferred by the inventors is different than prior art in that the starting image used for decoding is a randomly generated image rather than a predetermined image. In another variation, decoding iterations are performed at a series of small, constant sizes with intervening step function increases in image size. Both these techniques result in faster processing than techniques disclosed in the prior art.

Figure 8:
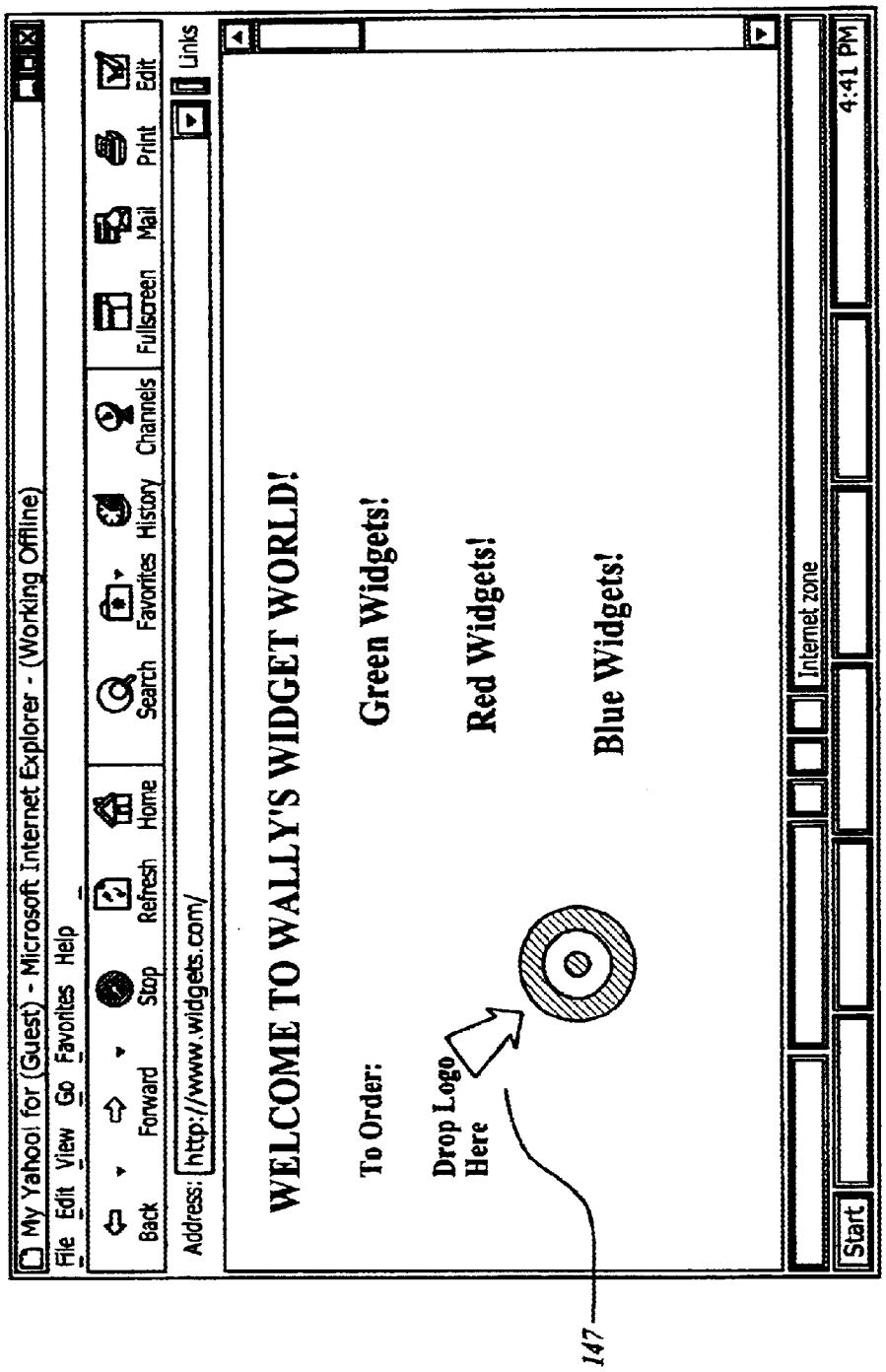
FIG. 8 illustrates a logo pocket on a web page.

FIG. 8 depicts a Web page with drop target 147. In this example, a region of the page contains the instructions "To Order: Drop Logo Here" and a graphical target. This drop target or active region 130 calls the interface and control manager on the client machine and transfers the transaction server address to the logo manager, as shown in steps 124 and 125 of FIG. 5.

Figure 9:
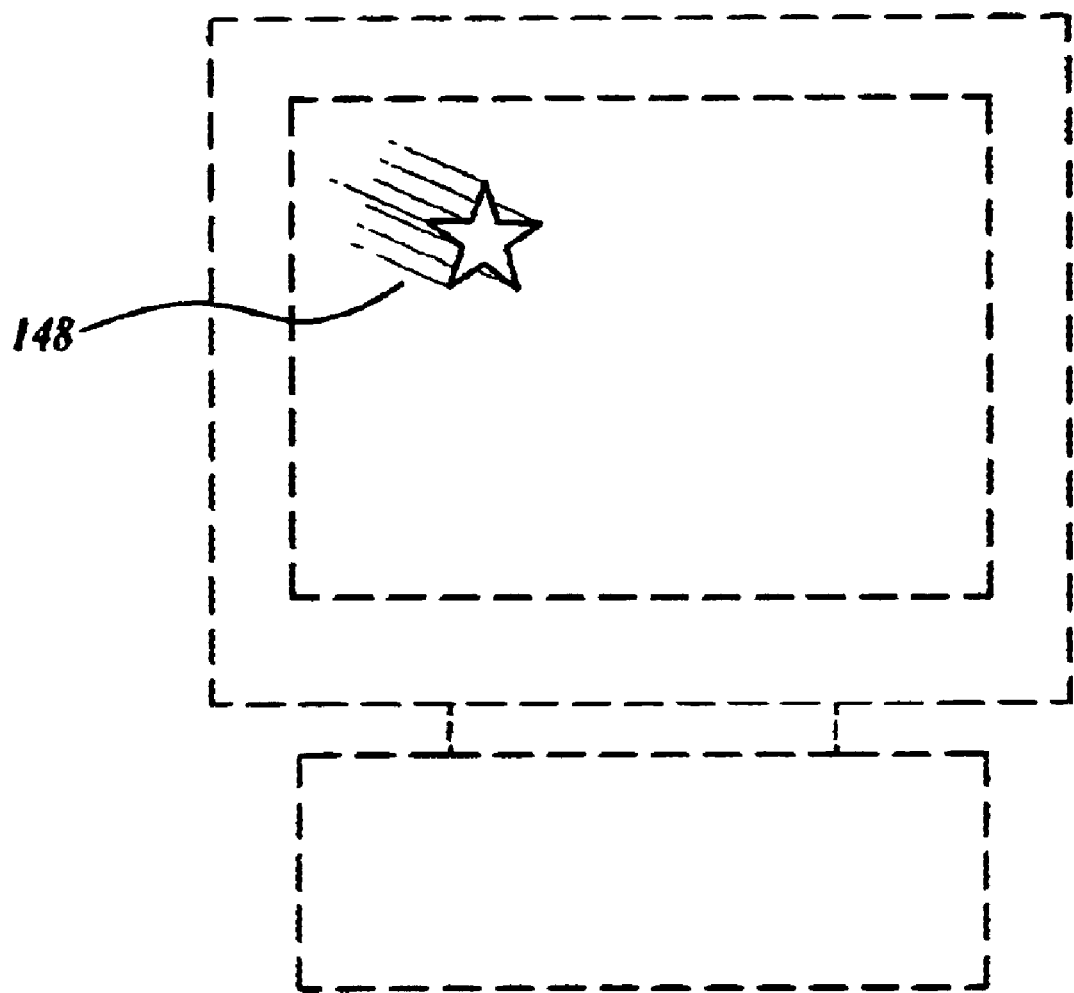
FIG. 9 shows a personal logo as represented on a computer screen.

FIG. 9 shows a depiction of a personal logo 148 on a client machine.

As an alternative to creating a base logo based upon user input, a base logo may be provided by a third party such as a web vendor. Whereas a user-selected base logo is useful for many generic network transactions, a third party-provided base logo is useful for encoding information particular to the type of transactions that a user may repeatedly have with that third party. For example, a web-based clothing retailer may wish to encode a user's clothing sizes, color preference, height, weight, hair color, eye color, shoe size, customer number and favorite activities. Such data would be useful for automating ordering transactions and for recommending merchandise to that customer. For the case of a third party-provided base logo, the logo may be a pictorial representation of a vendor's business logo. Such a logo may, after creation, be co-resident on a user's computer with other third party logos representing data useful to other vendors, clubs, special interest groups, employers, unions, banks, utility companies, or other parties with which the user has occasional or regular transactions.

In the case of a logo provided by a third party, said logo may not truly be a base logo devoid of individualization, but may be a transformed or perturbed logo that already contains information particular to the third party to aid in identifying the user. In any event, some or all of the particular data provided by the third party may be encrypted or hidden from the user to avoid tampering.

Figure 10:
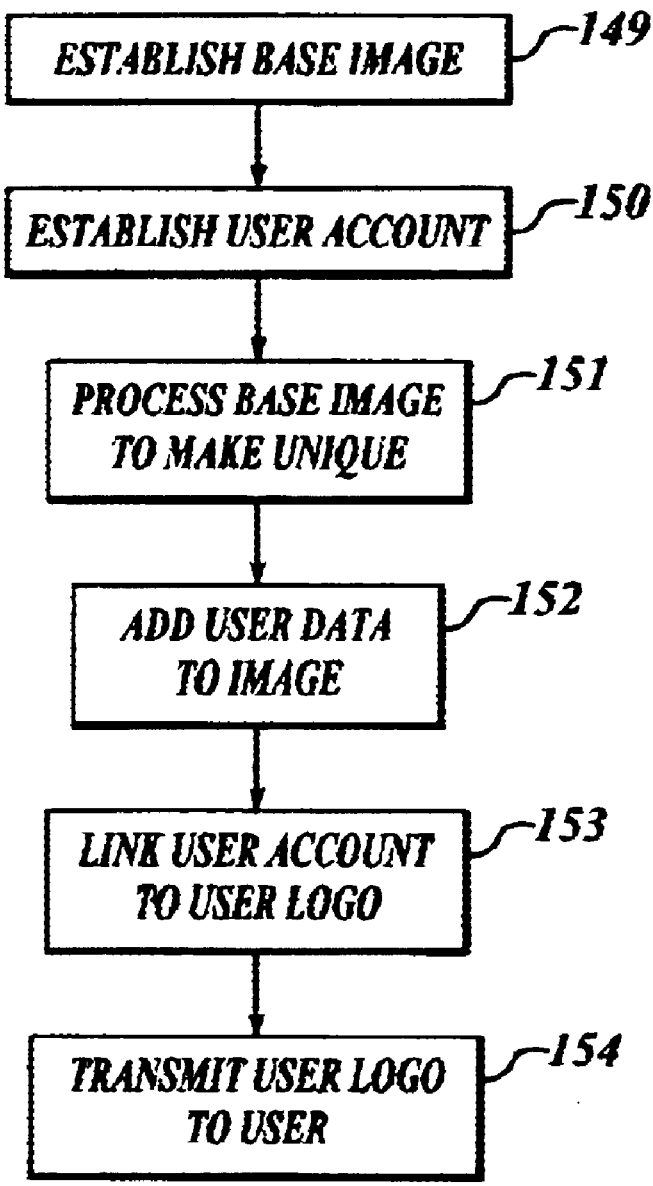
FIG. 10 shows a method for an enterprise to make a personal logo for a client.

FIG. 10 depicts a method for creating a personal logo for a customer. In step 149 a base image is established. This may be a digital representation of a company logo, for instance. In step 150, a user account is established. This may involve creating a new account or may involve reading account information from an existing database. Step 151 represents an optional step for creating a unique version of the logo. This may involve a technique as in FIG. 3 or 4 or a variant thereof. For the case of vendor-issued personal logos, it may be desirable not to use a random number. Instead, it may be desirable to distribute data and/or vary a coefficient selection according to a predetermined sequence such as a serial number. Step 152 represents adding user information to a logo. In particular, it may be advantageous to encode information appropriate for the type of transaction offered by the company. In step 153, the particular logo is linked to a company database. This may be used later to verify user identity during transactions. In step 154, the resultant personal logo is transmitted to the user. This may be accomplished, for instance, using active web page technology.

Figure 11:
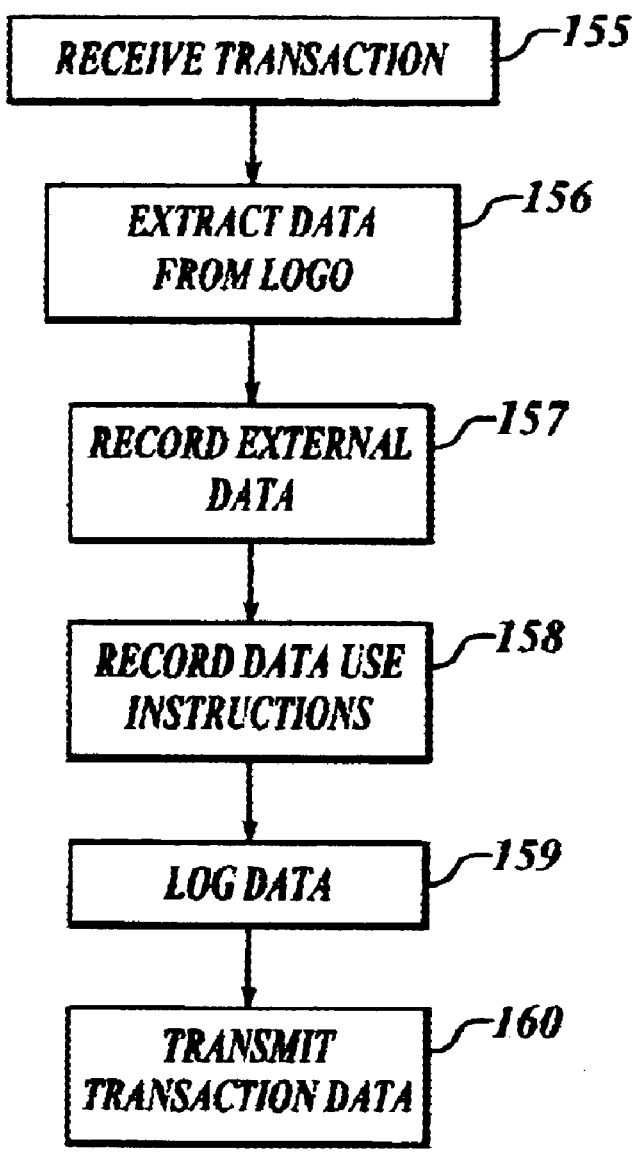
FIG. 11 shows a method for extracting data from a received DCO.

FIG. 11 depicts a server-side computer program for receiving a transaction, extracting data in the form of a logo level, recording other transaction data, and storing said data in a log. The transaction server receives transaction data 155 from a network in the form of a DCO. Using the methods described elsewhere, the computer program then extracts data and data use instructions, if data use instructions are present, from the DCO in 156. In step 156, the computer program may also record UGPI uniqueness characteristics. One way for doing this is to record all the transformation coefficients extracted from the personal logo. Another way is to record one or more galois field remainders, using the remainder or remainders as a checksum. The computer program optionally records external data in step 157 including some or all of time of day, date, client computer URL or address, page server address, terms and conditions, goods ordered, payment method, and payment amount. In step 158, the computer program writes any data use instructions to a log and in step 159 logs data pertaining to the transaction. In step 160, the computer program transmits transaction data to another portion of the computer program, to another computer program, or to another computer for further processing and fulfilling the transaction.

Figure 12:
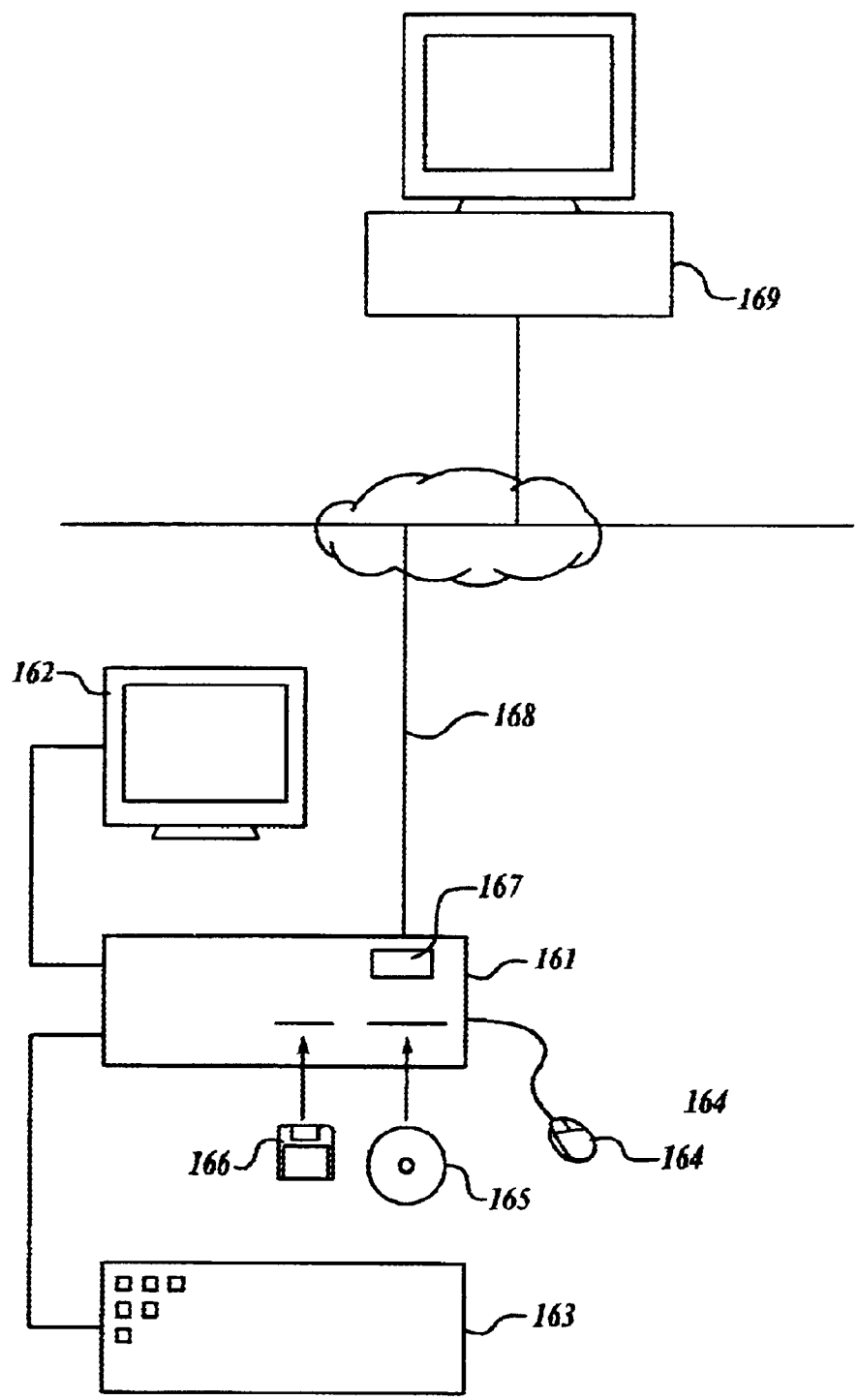
FIG. 12 shows a computer system for carrying out the present invention.

FIG. 12 illustrates a computer system for carrying out the present invention. A first computer 161 may include some or all of a display 162, a keyboard 163, a pointing device 164, a drive for reading optical media 165, a drive for reading removable magnetic media 166, and internal storage such as a hard drive 167. Additional input devices such as for instance a bar code scanner, an image scanner, or a digital camera may also be connected to the first computer 161. The first computer 161 is connected via interconnection 168 to at least a second computer 169. Interconnection 168 may be a point-to-point wired, RF, or optical link or may be a network such as a wired LAN, a radio LAN, a WAN, or the Internet. In some embodiments, the first computer 161 is a client computer and the second computer 169 is a server. The first computer is able to receive computer readable instructions for performing the steps described herein over any of the input devices or interconnections described. Some or all of the steps described herein may be performed by the first computer 161. Additionally or alternatively, some or all of the steps described herein may be performed by at least a second computer 169 and accessed by the first computer 161 via interconnection 168.

It will thus be seen that according to the present invention a simple yet effective means to create a personal presence and convenience during network transactions has been provided. While the invention that has been shown herein is the most practical and preferred embodiment as presently conceived, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A computer-readable medium containing instructions for controlling a computer system to encode data comprising:
- establishing a first set of data;
- establishing a first logo;
- performing a fractal transformation on said first logo to create a first set of fractal transformation coefficients;
- substituting at least one bit from said first set of data to a plurality of said first set of fractal transformation coefficients to form a second set of fractal transformation coefficients; and
- wherein said fractal transformation comprises selecting a plurality of library blocks from said first logo;
- dividing said first logo into a set of target blocks;
- comparing each target block to said plurality of library blocks to determine how well each said target block matches each of said library blocks;
- selecting a library block and transformation coefficients corresponding to each target block;
- replacing each said target block with said corresponding transformation coefficients and a reference to said corresponding library block; and
- writing each said corresponding transformation coefficients and said reference to said corresponding library block to memory.

2. The computer-readable medium containing instructions for controlling a computer system to encode data of claim wherein said set of target blocks are non-overlapping and which together fully tile said first logo.

3. A computer-readable medium containing instructions for controlling a computer system to create a unique image, comprising the acts of:
- creating a plurality of library blocks from a base image;
- creating a plurality of target blocks from said base image;
- comparing each of said plurality of target blocks to each of said plurality of library blocks;
- selecting for each said target block a first corresponding library block from said plurality of library blocks wherein said first corresponding library block is the most similar of said plurality of library blocks to said target block;
- selecting for each said target block a second corresponding library block from said plurality of library blocks wherein said second corresponding library block is different from said first corresponding library block; and
- assigning one of said first corresponding library block or said second corresponding library block to replace each said target block from said plurality of target blocks to form a fractal transformation for said base image wherein at least one of said assignments is a first corresponding library block and at least one of said assignments is a second corresponding library block.

4. The computer-readable medium containing instructions for controlling a computer system to create a unique image of claim 3 further comprising instructions for the act of decoding said fractal transformation for said base image to form a perturbed derivative of said base image.

* * * * *